US006985921B2

(12) United States Patent
Covelli et al.

(10) Patent No.: US 6,985,921 B2
(45) Date of Patent: Jan. 10, 2006

(54) RELIABILITY AND PERFORMANCE OF SNMP STATUS THROUGH PROTOCOL WITH RELIABILITY LIMITATIONS

(75) Inventors: Ernest F. Covelli, Eagle, ID (US); Robert J. Madril, Jr., Boise, ID (US); Matt Howell, Boise, ID (US); Steven Kolstad, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 855 days.

(21) Appl. No.: 09/779,222

(22) Filed: Feb. 6, 2001

(65) Prior Publication Data

US 2002/0107978 A1    Aug. 8, 2002

(51) Int. Cl.
    *G06F 15/16*    (2006.01)

(52) U.S. Cl. ............... 709/203; 709/238; 709/218
(58) Field of Classification Search ........... 709/223, 709/224, 201, 238, 219, 203; 711/163; 719/316; 714/43

See application file for complete search history.

(56) References Cited

U.S. PATENT DOCUMENTS

| 5,727,145 A * | 3/1998 | Nessett et al. ............... 713/200 |
| 6,219,703 B1 * | 4/2001 | Nguyen et al. ............. 709/224 |
| 6,275,853 B1 * | 8/2001 | Beser et al. ................ 709/223 |
| 6,336,175 B1 * | 1/2002 | Shaath et al. ............... 711/163 |
| 6,757,747 B1 * | 6/2004 | Hooper ....................... 719/316 |
| 2005/0034029 A1 * | 2/2005 | Ramberg et al. ............. 714/43 |

* cited by examiner

*Primary Examiner*—Rupal Dharia
*Assistant Examiner*—Djenane Bayard (57) ABSTRACT

A system for an interceptor client is utilized to improve the reliability of data transfer between devices on a network. In particular, the interceptor client may be configured to monitor transactions between a SNMP manager application and a SNMP application. The interceptor client may be further configured to monitor and to identify a "Get" command requesting multiple object identifiers (OIDs), e.g., OID.a, OID.b, ..., OID.n, from a destination agent. The interceptor client may be further configured to preprocess the requested OIDs to the nearest possible previous OIDs, i.e., OID.a−1, OID.b−1, ..., OID.n−1. The interceptor client may be further configured format the requested "Get" command as a "Get-Next" command requesting the modified OIDs from the destination agent. "Get-Next" command will always retrieve the next value in the tree of the MIB, regardless of whether or not a valid OID was specified.

20 Claims, 8 Drawing Sheets

RELIABILITY AND PERFORMANCE OF SNMP STATUS THROUGH PROTOCOL WITH RELIABILITY LIMITATIONS

TECHNICAL FIELD

The invention relates to computer networks. More particularly, the invention relates to improving the reliability of a block transfer of data from a server to a client utilizing SNMP protocol.

BACKGROUND ART

Network communications have become a fundamental part of today's computing. It is not uncommon to find two or more computer systems collaboratively working together to solve problems such as simulations, modeling, forecasting, etc. In fact, these efforts have been so successful, users have been inclined to design and implement larger networks.

As the networks grow larger, increasingly complex, and interface with a variety of diverse networks, it is the task of a network manager to keep track of the devices on the networks, to monitor performances and load, diagnose, and correct problems with the network.

While products that manage homogeneous networks have been available, managing heterogeneous networks is more complex, and a generally accepted heterogeneous network management standard did not exist. More recently, Simple Network Management Protocol (SNMP) was developed to provide a heterogeneous network management standard.

SNMP has since become widely accepted as the protocol of choice for managing Transmission Control Protocol/Internet Protocol (TCP/IP) based network systems. SNMP provides network managers the capability to monitor and to control network devices and the systems which contain SNMP agents, independent of the network topology or complexity.

The SNMP model of a managed network consists of four types of components: (1) managed nodes; (2) management stations; (3) management information; and, (4) a management protocol. The managed nodes can be hosts, routers, bridges, printers or any other devices capable of communicating status information to the management stations. Management stations monitor and manage the devices on the network. The management information contains information on the components of the network. The management protocol is the format in which this information is communicated to the management system.

A management station communicates with agents over the network using the SNMP protocol, which allows the management station to query the state of the specified agent's local objects and modify them as necessary. Therefore, the management station communicates with the management information bases of each agent. SNMP provides the following four basic operations for communication: (1) "Get", which is used to retrieve specific management information; (2) "Get-Next", which is used to retrieve via traversal, management information; (3) "Set", which is used to manipulate management information; and, (4) "Trap", which is used to report extraordinary events. By using these operators, the SNMP manager application may communicate with the agents to identify the agents and to determine statistical information, such as network traffic flow through a given computer network.

SNMP messages contain two parts: (1) a message header and (2) a protocol data unit. The message header comprises a version number and a community name. The community name serves to define an access environment for a set of network management stations using the community name. Additionally, since devices which do not know the proper community name are precluded from SNMP operations, network managers may also use the community name as a weak form of authentication.

Figure 6:
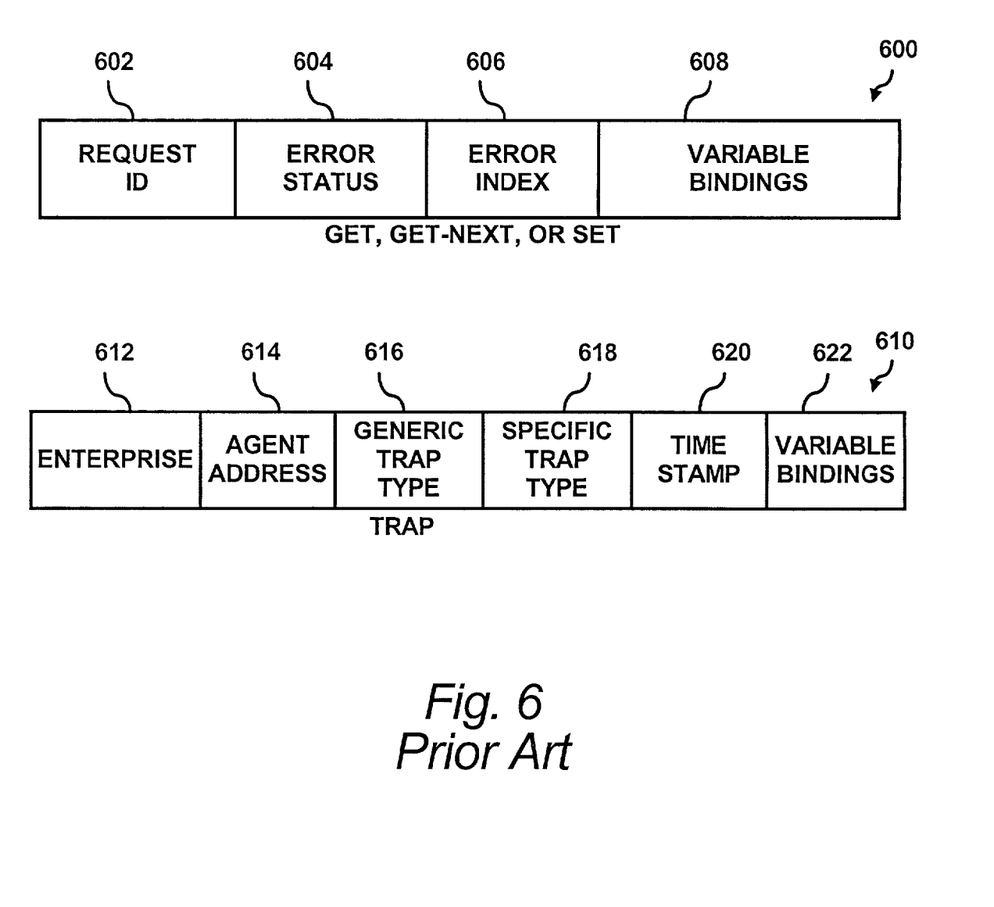
FIG. 6 illustrates a block diagram of fields of the "Get", "Get-Next", "Set", and "Trap" commands of the SNMP protocol.

The data portion of an SNMP message contains the specified SNMP operation, e.g., "Get", "Get-Next", "Set" or "Trap", as well as the operation's associated data. FIG. 6 depicts the format for the data portion. The format for a "Get", "Get-Next", or "Set" command 600 includes four fields. The first is a request-ID field 602, which associates requests with responses. The second is an error status field 604, which indicates an error and an error type. The third is an error index field 606, which associates the error with a particular variable in the variable bindings. The fourth is a variable bindings field 608, which comprises the data. Each variable binding associates a particular variable with its current value (except in "Get" and "Get-Next" requests, where the value is ignored).

The format for a "Trap" command 610 includes six fields. The first is an enterprise field 612, which identifies the type of the object generating the trap. The second is an agent address field 614, which provides the address of the object generating the trap. The third is a generic trap type field 616, which provides the generic trap type. The fourth field is a specific trap type code 618, which provides the specific trap type. The fifth field is a time stamp field 620, which provides the amount of time that has elapsed between the last network re-initialization and generation of this trap. The sixth field is the variable bindings field 622, which provides a list of variables containing information of interest about the trap.

Figure 7:
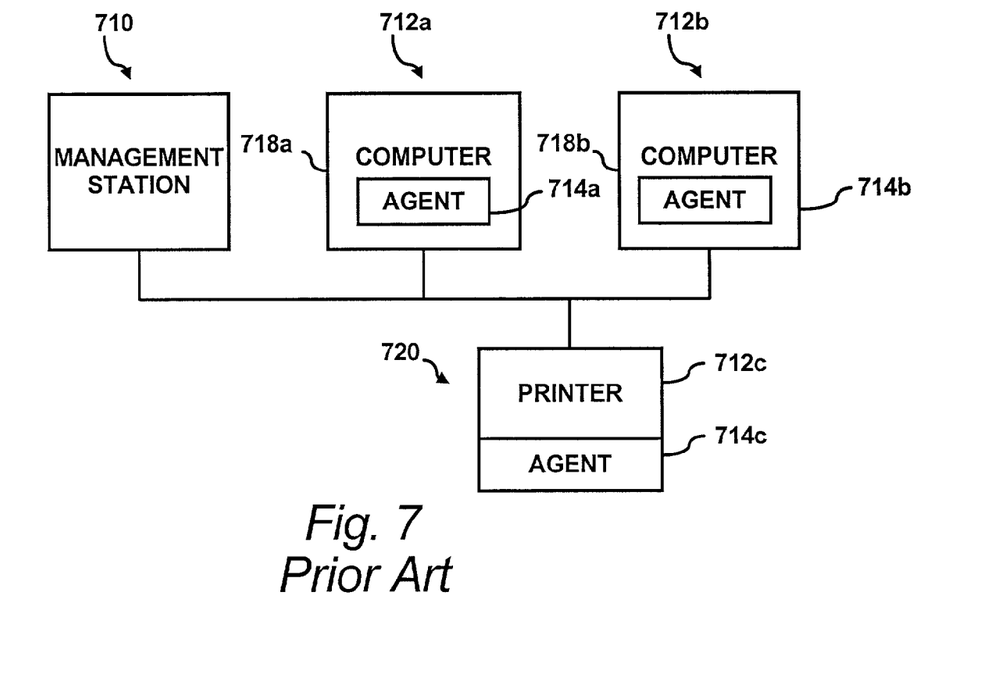
FIG. 7 illustrates a conventional network implementing SNMP protocol.

FIG. 7 is a block diagram which illustrates an example of a conventional network utilizing the SNMP model. Management station 710 controls a plurality of nodes 712*a*, 712*b*, 712*c* which in the figure include two computers 718*a*, 718*b* at nodes 712*a*, 712*b*, respectively, and a printer 720 at node 712*c*. In order for an SNMP management station 710 to manage a node directly, the node must be able to run an SNMP agent. The SNMP management station and/or agent processes are normally encoded in software. A hardware implementation for use with certain nodes is also possible. In FIG. 7, the agents 714*a*, 714*b* running on each of the computers 718*a*, 718*b*, respectively, would most likely be encoded in software, whereas the agent 714*c* for the printer 720 would most likely be a hardware implementation.

Figure 8:
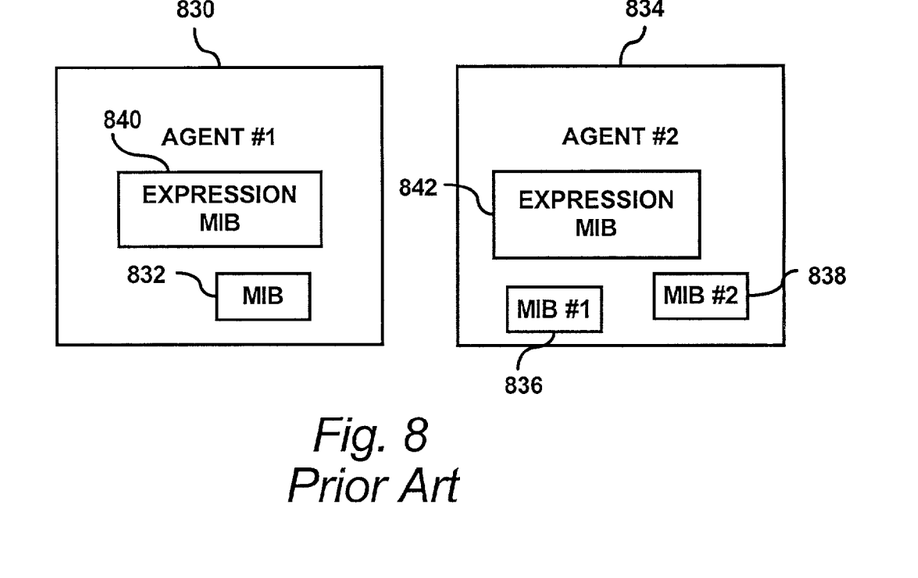
FIG. 8 illustrates conventional agents with various types of MIB in the SNMP protocol architecture.

In the SNMP protocol, each SNMP agent may maintain one or more variables that describe the node's state. These variables are also called "objects" and are identified by an "Object Identifier" (OID). Related managed objects are grouped together in a data structure called a "Management Information Base" (MIB). FIG. 8 illustrates two different examples of SNMP agents. The first agent 830 contains a management information base 832. It is also possible to have multiple management information bases within each agent, as seen in the second agent 834, which contains management information bases 836 and 838. In addition, each node on the network may have different types of management information bases such as expression MIB 840, 842.

A MIB is maintained by its respective agent which contain OIDs that may describe the current and past states of the node to which it is assigned, as well as provide instructions to affect the operation of the node. The management stations then carry out the management of the network. The management stations have one or more processes that communicate with the SNMP agents through the network by issuing commands and getting responses. One of the advantages of this design is much of the complexity of the system is located in the management stations, rather than in the SNMP agents, allowing the agents to be as simple as possible in order to minimize their effect on the nodes on which they are running.

In typical communication with an agent, a management station may request multiple objects with a single "Get" command from a destination agent. However, if one of the requested objects does not exist on the destination agent, the entire "Get" command fails. The SNMP protocol cannot guarantee that the retrieved data is reliable. Accordingly, a user of the management station is not assured of the reliability of the requested objects.

In response to this failure, a user of the management station may decide to issue single "Get" command on each of the requested objects. However, this increases the time that a user has to spend in retrieving the requested objections. Moreover, issuing multiple "Get" commands increases the traffic on the network between the agent and the management station, which may lead to congestion and performance degradation in the network.

SUMMARY OF INVENTION

In accordance with the principles of the present invention, a method for transferring data between a local device and a remote device over a network where the local device has a communication architecture having at least an application layer and an interceptor layer. The method includes receiving by the interceptor layer a first command from the application layer, the first command specifying a first plurality of identifiers where the first command is configured to return an associated value for each identifier of the plurality of identifiers. The method further includes issuing a second command by the interceptor layer, the second command specifying a second plurality of identifiers where the second command is configured to return a next identifier and associated value for each identifier of the another plurality of identifiers in response to said receiving of the first command.

One aspect of the present invention provides for a system for improving reliability of data transfer. The system includes an interface, at least one processor, a memory coupled to the one processor, and an interceptor client. The interceptor client, residing in the memory and executed by at least one processor, is configured to receive by the interceptor layer a first command from the application layer, the first command specifying a first plurality of identifiers where the first command is configured to return an associated value for each identifier of the plurality of identifiers. The interceptor client is further configured to issue a second command by the interceptor layer, the second command specifying a second plurality of identifiers where the second command is configured to return a next identifier and associated value for each identifier of the another plurality of identifiers in response to the receiving of the first command.

Another aspect of the present invention provides for a computer-readable storage medium on which is embedded one or more computer programs. The one or more computer programs implements a method for improving reliability of data transfer. The one or more computer programs include a set of instructions for receiving by the interceptor layer a first command from the application layer, the first command specifying a first plurality of identifiers wherein the first command is configured to return an associated value for each identifier of the plurality of identifiers, and issuing a second command by the interceptor layer, the second command specifying a second plurality of identifiers where the second command is configured to return a next identifier and associated value for each identifier of the another plurality of identifiers in response to the receiving of the first command.

In comparison to known prior art, certain embodiments of the invention are capable of achieving certain advantages, including some or all of the following: (1) improvement of the reliability of the data, or object, transferred; (2) improve network performance; and, (3) decreased network traffic.

Additional advantages and novel features of the invention will be set forth in part, in the description which follows, and in part, will become apparent to those skilled in the art upon examination of the following or may be learned by practice of the invention. The advantages of the present invention may be realized and attained by means of instrumentalities and combinations particularly pointed in the appended claims.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplary embodiment thereof. Although the preferred embodiment of the invention may be practiced as a software system, one of ordinary skill in the art would readily recognize that the same principles are equally applicable to, and can be implemented in, a hardware system, and that any such variation would be within such modifications which do not depart from the true spirit and scope of the present invention.

In accordance with the principles of the present invention, an interceptor client is utilized to improve the reliability of data transfer between devices on a network. In particular, the interceptor client may be configured to monitor transactions between a SNMP manager application and a SNMP application. The interceptor client may be further configured to monitor and to identify a "Get" command requesting multiple object identifiers (OIDs), e.g., OID.a, OID.b, . . . , OID.n, from a destination agent. The interceptor client may be further configured to preprocess the requested OIDs to the nearest possible previous OIDs, i.e., OID.a−1, OID.b−1, . . . , OID.n−1. The interceptor client may be further configured format the requested "Get" command as a "Get- Next" command requesting the modified OIDs from the destination agent. The "Get-Next" command will always retrieve the next value in the tree of the MIB, regardless of whether or not a valid OID was specified. Accordingly, when the interceptor client reformats the "Get" command to a "Get-Next" command, the user is assured of the fact that the requested data will always be returned and is not invalidated by an error message as with the "Get" command.

Figure 1:
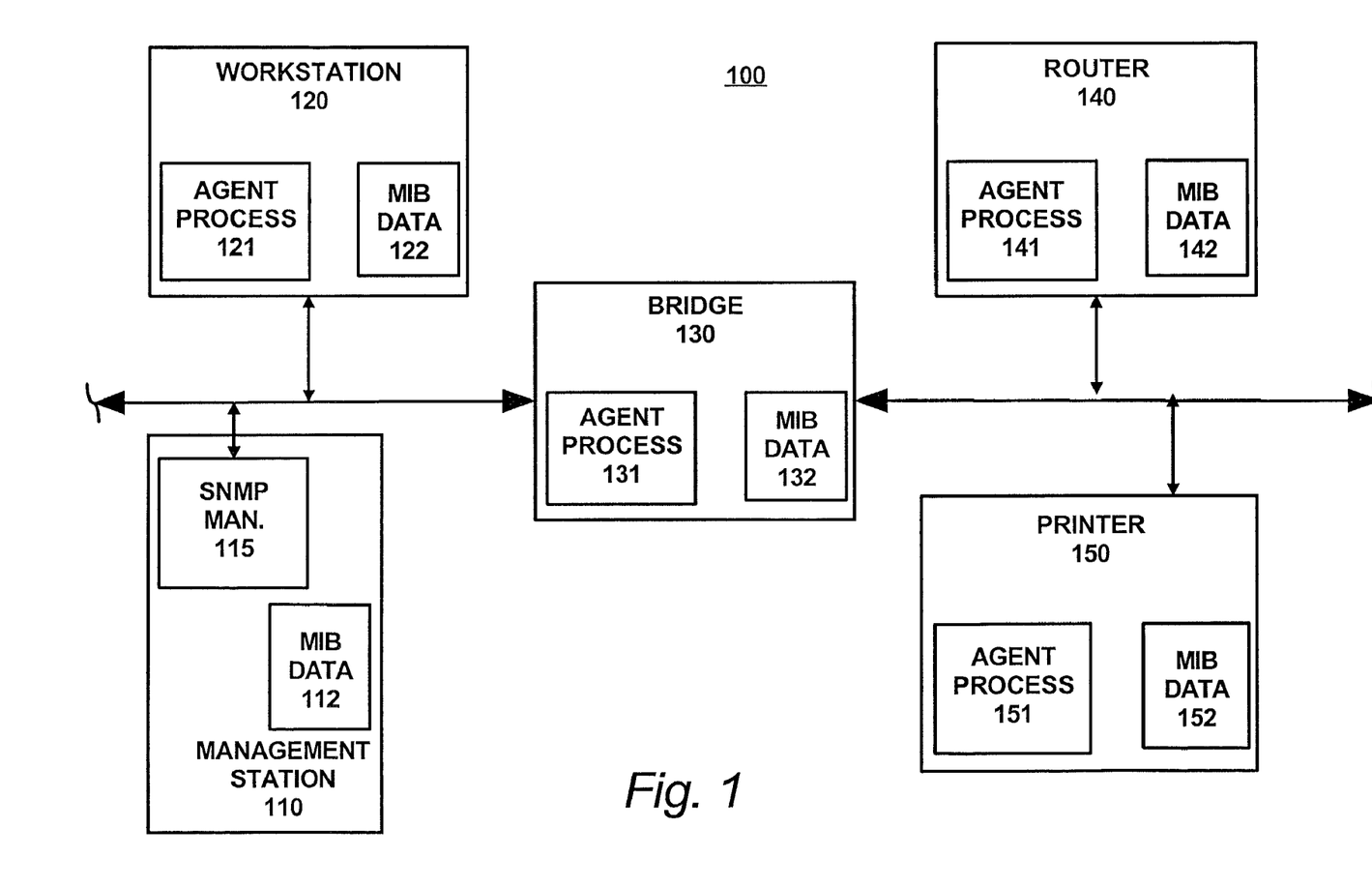
FIG. 1 illustrates a computing environment in which an embodiment of the present invention may be implemented.

FIG. 1 illustrates a block diagram of a computer network 100 in which the present invention may be practiced. As shown in FIG. 1, the computer network 100, which is managed using the Simple Network Management Protocol (SNMP) protocol, includes, e.g., a management station 110, a workstation 120, a bridge 130, a router 140, and a printer 150. Computer network 100 may also include any number of components, e.g., personal computers, repeaters, and hubs. The computer network 100 is configured to provide a communication path for each network device to communicate with other network devices. The network 102 may be the Internet, Public Switched Telephone Network (PSTN), a local area network or the like.

The SNMP protocol is a client-server-based application protocol. Management station 110 executes a SNMP manager application 115 that communicates with SNMP agent processes 121, 131, 141, and 151. In particular, the SNMP manager 115 communicates with one or more of the client processes, i.e., agent process 121 on workstation 120, agent process 131 on bridge 130, agent process 141 on router 140, and agent process 151 on printer 150 using the SNMP protocol. An agent computer process must be programmed for each of the computer network elements, and the actions that are to be taken must be specifically programmed for each computer network element.

Each of agent processes 121, 131, 141, and 151 monitors and controls the operation of the computer network element containing the agent process, i.e., elements 120, 130, 140, and 150, respectively, by maintaining a data base of objects 122, 132, 142, and 152, respectively, called the Management Information Base (MIB). The MIB reflects the status of the managed computer network element. Each of the agent processes 121, 131, 141, and 151 responds to network management requests from SNMP manager 115. Manager 115 maintains statistics that define the operation of network 100 in MIB 112.

Figure 2:
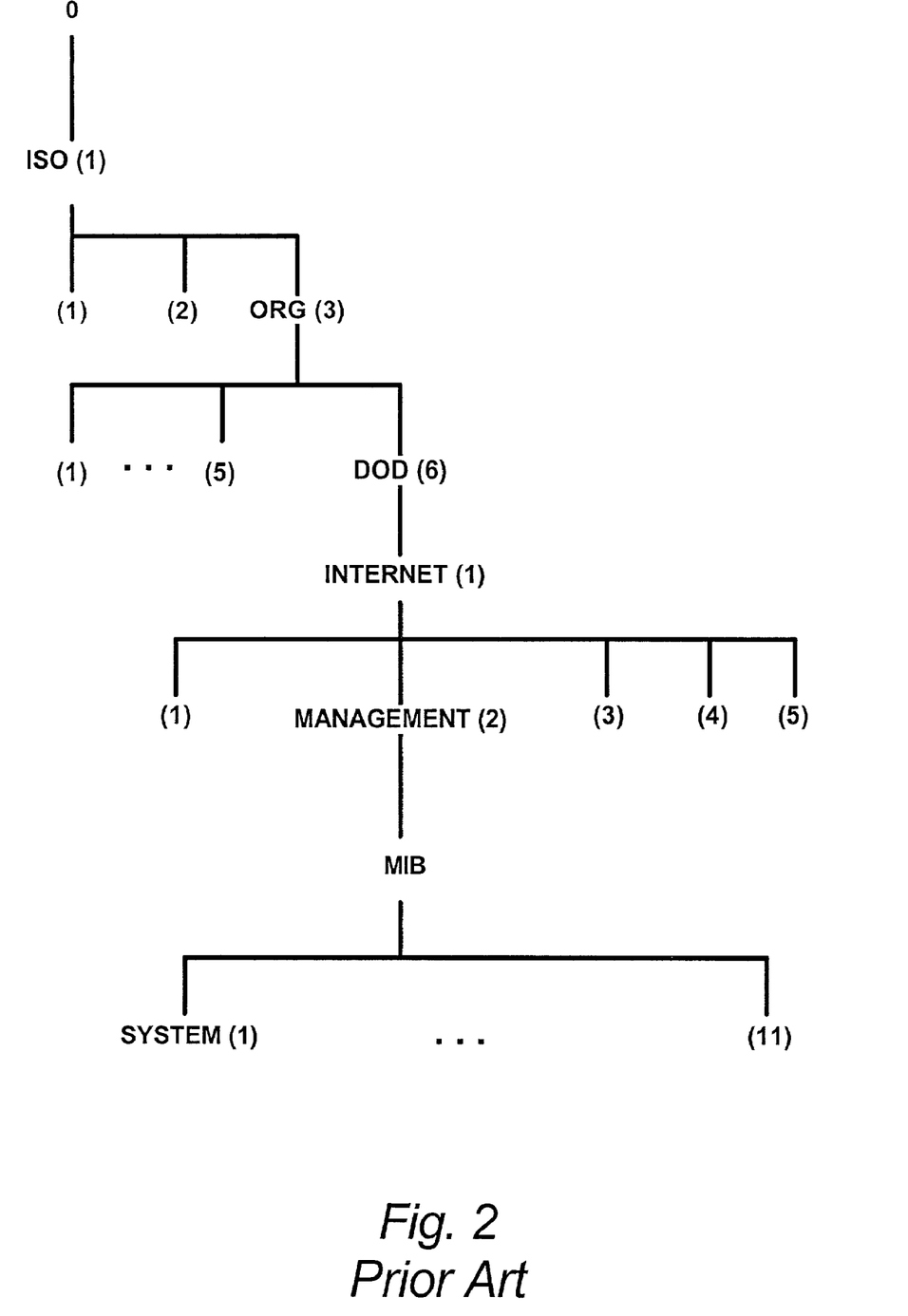
FIG. 2 illustrates a tree structure of a MIB database.

FIG. 2 illustrates a MIB database tree for one of the agents in the computer network 100 shown in FIG. 1. The MIB objects are grouped according to functionality and are categorized in a tree-like data structure. The tree is comprised of a root, branches, and leaf nodes. The leaf nodes represent MIB object instances and are located at the lowest levels in the tree. To simplify the traversal process, each branch at the same level in the tree is assigned a lexicographically ordered number. Thus, each node in the tree is represented by a sequence of period-separated numbers, where each number is associated with a branch level. The sequence of numbers is known as the "Object Identifier" (OID). From FIG. 2, one can determine that the object identifier for the system group is "1.3.6.1.2.1.1 ".

The present invention is platform independent. For example management station 110 may be a personal computer (PC) system running an operating system such as WINDOWS 95™ or OS/2™, a MAC™, or a UNIX™ based system. However, the invention is not limited to these platforms. Instead, the invention can be implemented on any appropriate computer system running any appropriate operating system, such as SOLARIS™, IRIX™, LINIX™, etc.

Figure 3:
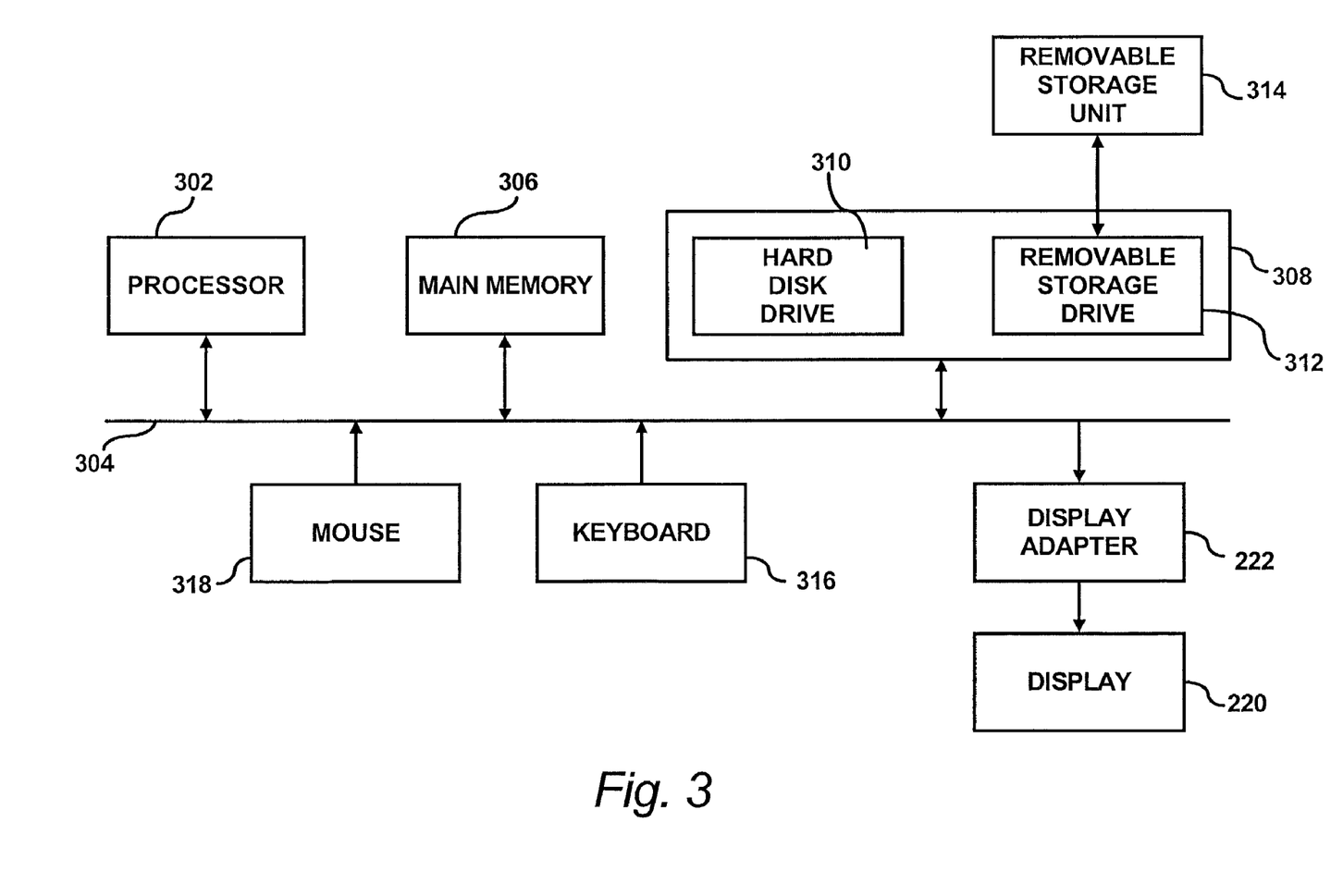
FIG. 3 illustrates a block diagram of a computing platform in which an embodiment of the present invention may be implemented.

An exemplary computer system 300 implementing the management station 110 is shown in FIG. 3. The functions of the management station 110 are implemented in program code. In particular, the computer system 300 includes one or more processors, such as processor 302 which provides an execution platform for the management station 110. Commands and data from the processor 302 are communicated over a communication bus 304. The computer system 300 also includes a main memory 306, preferably Random Access Memory (RAM), where the software for the management station 110 is executed from during runtime, and a secondary memory 308. The secondary memory 308 includes, for example, a hard disk drive 310 and/or a removable storage drive 312, representing a floppy diskette drive, a magnetic tape drive, a compact disk drive, etc., where a copy of software for the management station 110 is stored. The removable storage drive 312 reads from and/or writes to a removable storage unit 314 in a well-known manner. A user interfaces with the management station 110 with a keyboard 316, a mouse 318, and a display 320. The display adaptor 322 interfaces with the communication bus 304 to receive display data from the processor 302 and convert the display data into display commands from the display 320.

Figure 4:
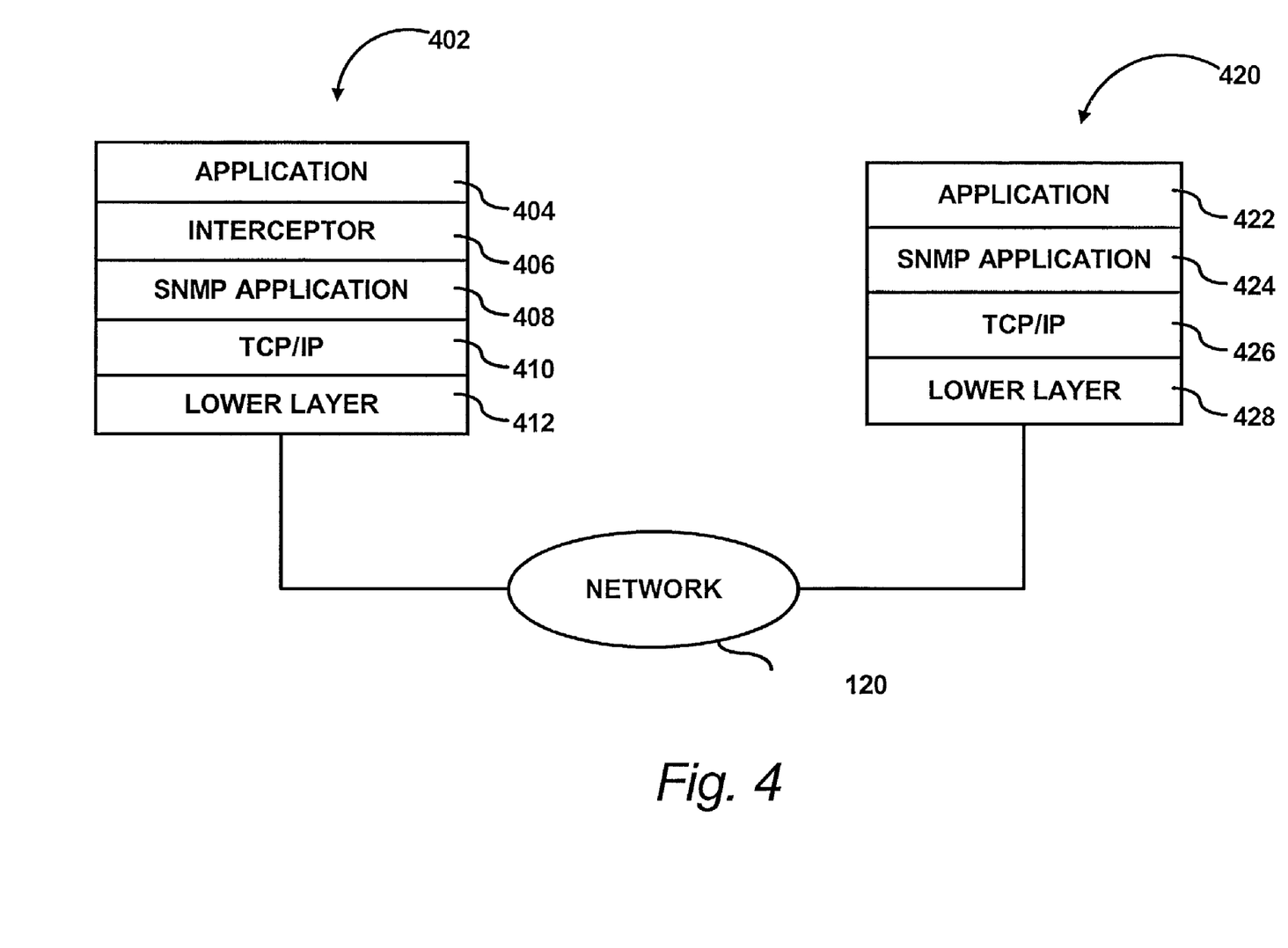
FIG. 4 illustrates a block diagram of a communication architecture of a local device and a remote device implementing an embodiment of the present invention.

FIG. 4 illustrates a management communication architecture 402 that includes an embodiment of the present invention. As shown in FIG. 4, the SNMP management process 115 may be configured to have the management communication architecture 402 that implements an embodiment of an interceptor client 406. In particular, the management communication architecture 402 includes a SNMP manager application 404, the interceptor client 406, a SNMP application function 408, a TCP/IP application 410, and a lower layer 412. Further, the agent 117 has an agent communication architecture 420 that includes an agent application function 422, a SNMP application function 424, a TCP/IP application 426, and a lower layer application 428.

The SNMP manager application 404 may be configured to issue SNMP commands in response to user attempts to manage the network 120. A user of the SNMP manager application 404 initiates an action, e.g., a "Get", "Get-Next", etc., to a destination agent, e.g., agent 117, and the SNMP manager application 404 calls the associated functions with the object identifier(s) as a parameter(s) from an "Application Programming Interface" (API) of the SNMP application function 408 in order to process the requested action. The SNMP application function 408 may be configured to packetize the request in response to the called function. The request packet is then encapsulated by the TCP/IP protocol application 410 and transported to the destination agent by the lower layer 408 as TCP/IP data packets. The agent receives the TCP/IP data packets through the lower layer 428, and the TCP/IP application 426 reformats the data packets and reassembles the request for the SNMP application function 424. The agent application 422 responds to the request by performing the requested action.

The interceptor client 406 may be configured to monitor transactions between the SNMP manager application 404 and the SNMP application 408. In particular, the interceptor client 406 may be configured to monitor and to identify a "Get" command requesting multiple object identifiers (OIDs), e.g., OID.a, OID.b, . . . , OID.n, from a destination agent. The interceptor client 406 may be further configured to preprocess the requested OIDs to the nearest possible previous OIDs, i.e., OID.a−1, OID.b−1, . . . , OID.n−1. The interceptor client 406 may be further configured to format the requested "Get" command as a "Get-Next" command requesting the modified OIDs from the agent.

In the SNMP protocol, a "Get-Next" command is used to retrieve the next OID in the MIB tree of data. As opposed to the "Get" command, which returns requested data, the "Get-Next" command returns the next OID in the tree and its value. Furthermore, unlike the "Get" command, the "Get-Next" command does return data for an OID that is too short or is missing the index part of the OID. For instance, if an OID was misidentified, the "Get" command would return an error for the misidentified OID. With "Get-Next" command, the "Get-Next" command still returns an answer, because "Get-Next" command will always retrieve the next value in the tree of the MIB, regardless of whether or not a valid OID was specified. Accordingly, when the interceptor client 406 reformats the "Get" command to a "Get-Next", the user is assured of the fact that the returned data is valid, and thus, highly reliable.

When the requested data is returned, the retrieved data is in a form of object pairs since "Get-Next" command returns an OID and a value. The interceptor client 406 compares each retrieved OID with the associated requested OID. If the OID matches, the requested OID is updated with the returned data. If the requested OID is less than the retrieved OID, this implies that the requested OID did not exist on the agent; the requested OID is updated with a status of non-existent, unavailable, etc. Finally, if the requested OID is greater than the retrieved OID, this implies the OID arithmetic did not succeed in identifying the previous OID and a single "Get" command is issued on the requested OID.

Figure 5A:
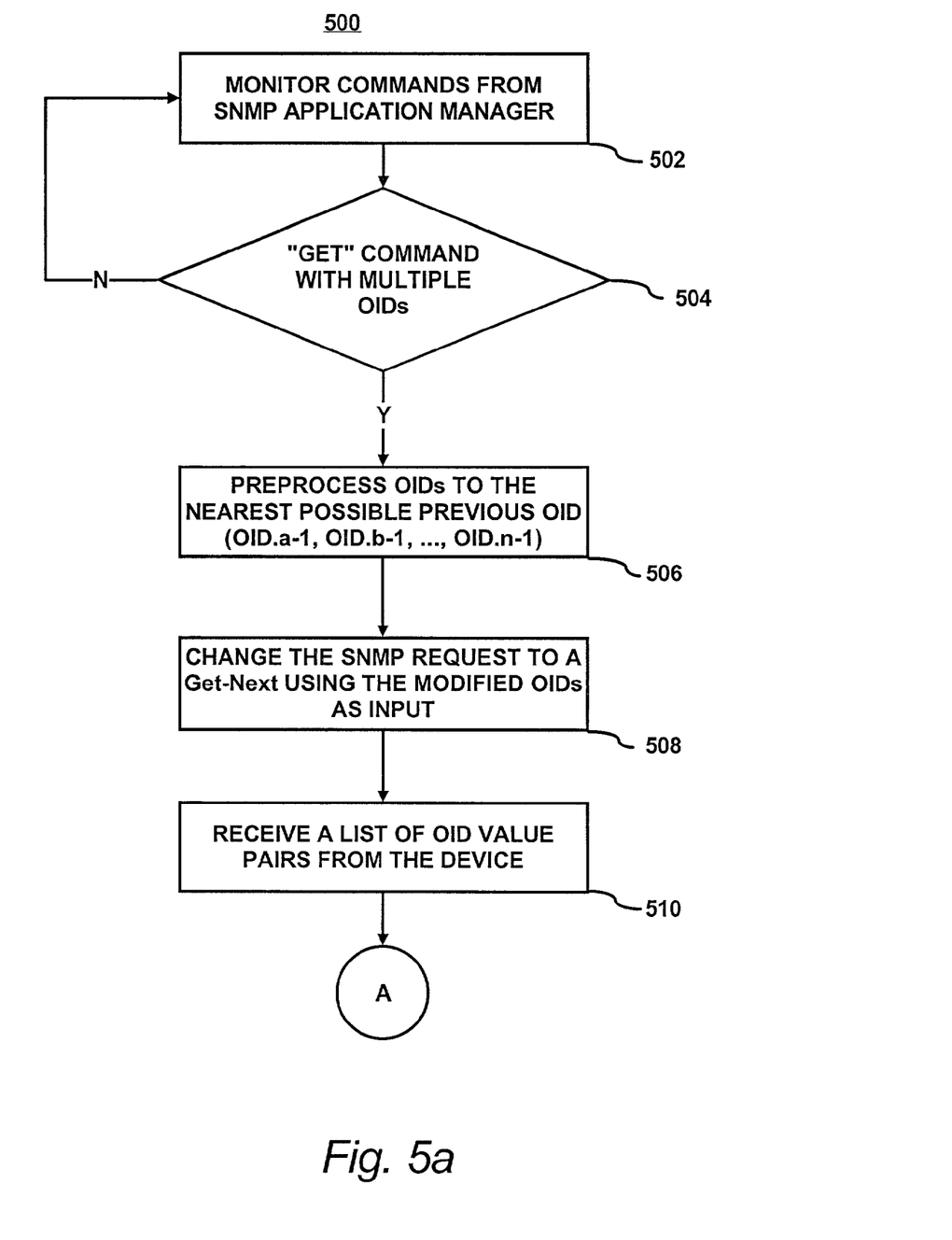
FIGS. 5a and 5b together illustrate a flow diagram of an exemplary embodiment of the present invention.
Figure 5B:
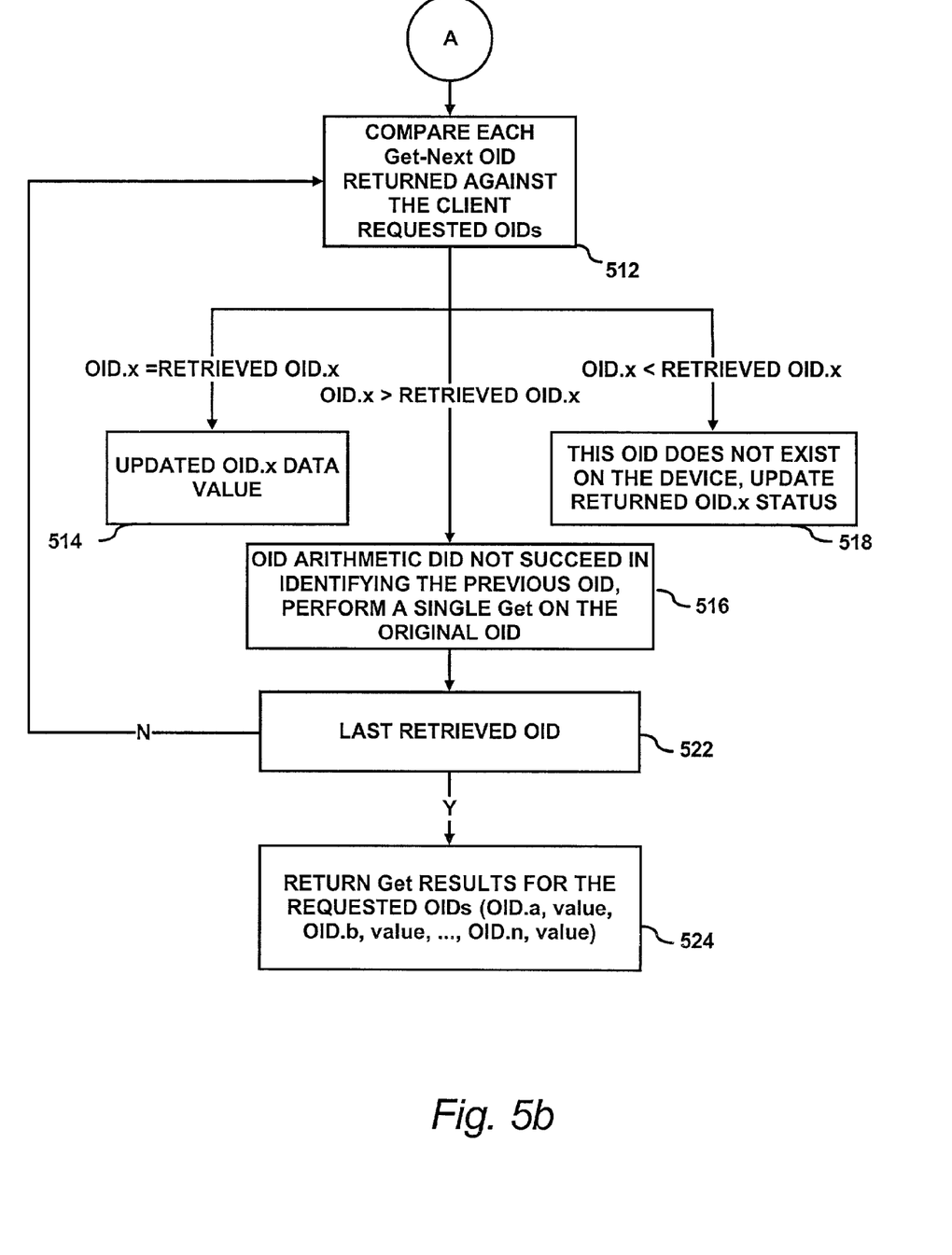

FIGS. 5a & 5b together illustrate a more detailed flow diagram 500 of an embodiment of the interceptor client 406 according to the principles of the present invention. As shown in FIG. 5, the interceptor client 406 is configured to monitor and examine the commands from the SNMP manager application 404 to the SNMP application 408, in step 502. If, in step 504, the command is any other command than a "Get" command with multiple OIDs, the application client 406 passes the issued command to the SNMP application 408. Otherwise, if the issued command is a "Get" command with multiple OIDs, e.g., OID.a, OID.b, . . . , OID.n, the interceptor client 406 allocates memory space to store the original multiple OIDs. For example, the interceptor client 406 may allocate space in the main memory 306 of the exemplary computer system 300 to create an array to store the original requested OIDs, e.g., OID.a, OID.b, . . . , OID.n.

The application client 406, in step 506, is further configured to pre-process the original requested OIDs. In particular, the application client 406 may be configured to take each requested OID (OID.a, OID.b, . . . , OID.n) and attempt to reconfigure the requested OIDs to the nearest possible previous OID, i.e., OID.a−1, OID.b−1, . . . , OID.n−1. It is expected that the arithmetic on the indices of the requested objects may not achieve the desired subtraction due to the openness of the SNMP protocol standard.

In step 508, the interceptor client 406 may be further configured to reformat the "Get" command to a "Get-Next" command using the modified indices in the Request ID 602 field, shown in FIG. 7, of the "Get-Next" command. Subsequently, the interceptor client 406 is configured to pass the "Get-Next" command with the modified OIDs to the SNMP application 408. The SNMP application 408 may be configured to packetize the "Get-Next" command with the modified OIDs in response to the called function. The request packet is then encapsulated by the TCP/IP protocol application 410 and transported to the destination agent by the lower layer application 412 as TCP/IP data packets.

In step 510, the destination agent has responded to the request packet and has returned the requested data based on the modified OIDs, e.g., OID.a−1, OID.b−1, . . . , OID.n−1, through the lower layer application 412, TCP/IP application 410 and the SNMP application 408. The interceptor client 406 temporarily stores the returned object pairs (OID and value) in a temporary memory location.

In step 512, the OID of one of the returned object pairs is compared against the requested OIDs. If the requested OID is the same as the retrieved OID, the requested OID value is updated with the instance of the retrieved OID, in step 514. If the requested OID is greater than the retrieved OID, this situation indicates that the original OID arithmetic performed in step 506 did not succeed in identifying the previous OID. In response, a "Get" command with the original requested OID, in step 516. If the requested OID is less than the retrieved OID, this situation indicates that the requested OID is does not exist on the destination agent, and the interceptor client 406 may be configured to note the status as non-existent for the original OID, in step 518.

In step 520, the interceptor client 406 checks whether there are any more comparisons of retrieved OIDs with the requested OIDs. If there are more comparisons, the interceptor client 406 returns to step 512; otherwise, the interceptor client 406 may be further configured to return the results for the requested OIDs, e.g., OID.a, OID.b, . . . , OID.n, to the SNMP manager application 404, in step 522.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for transferring data between a local device and a remote device over a network, said local device having a communication architecture having at least an application layer and an interceptor layer, said method comprising:
   receiving by said interceptor layer a first command from said application layer, said first command specifying a first plurality of identifiers wherein said first command is configured to return an associated value for each identifier of said plurality of identifiers; and
   issuing a second command by said interceptor layer, said second command specifying a second plurality of identifiers wherein said second command is configured to return a next identifier and associated value for each identifier of said another plurality of identifiers in response to said receiving of said first command.

2. The method for transferring data between a local device and a remote device over a network according to claim 1, further comprising:
   modifying each identifier of said first plurality of identifiers to an associated previous identifier to create said second plurality of identifiers; and
   issuing said second command specifying said second plurality of identifiers.

3. The method for transferring data between a local device and a remote device over a network according to claim 2, further comprising:

receiving a plurality of next identifiers and a plurality of values from said remote device, wherein each next identifier of said plurality of next identifiers has a corresponding value among said plurality of values.

4. The method for transferring data between a local device and a remote device over a network according to claim 3, further comprising:
comparing one of said first plurality of identifiers with associated one of said plurality of next identifiers.

5. The method for transferring data between a local device and a remote device over a network according to claim 4, further comprising:
updating said associated value of said one of first plurality of identifiers with corresponding value of said associated one of said plurality of next identifiers in response to said one of said first plurality of identifiers being equivalent to said associated one of plurality of next identifiers.

6. The method for transferring data between a local device and a remote device over a network according to claim 4, further comprising:
updating said one of said first plurality of identifiers as non-available in response to said one of said first plurality of identifiers being less than said associated one of plurality of next identifiers.

7. The method for transferring data between a local device and a remote device over a network according to claim 4, further comprising:
issuing another first command in response to said one of said first plurality of identifiers being greater than said associated one of plurality of next identifiers, said another first command specifying said one of said first plurality of identifiers.

8. A system for improving reliability of data transfer, said system comprising:
an interface;
at least one processor;
a memory coupled to said at least one processor;
an interceptor client residing in said memory and executed by said at least one processor, wherein said interceptor client is configured to receive by said interceptor layer a first command from said application layer, said first command specifying a first plurality of identifiers wherein said first command is configured to return an associated value for each identifier of said plurality of identifiers, and to issue a second command by said interceptor layer, said second command specifying a second plurality of identifiers wherein said second command is configured to return a next identifier and associated value for each identifier of said another plurality of identifiers in response to said receiving of said first command.

9. A system for improving reliability of data transfer according to claim 8, wherein said interceptor client further configured to modify each identifier of said first plurality of identifiers to an associated previous identifier to create said second plurality of identifiers, and to issue said second command specifying said second plurality of identifiers.

10. A system for improving reliability of data transfer according to claim 9, wherein said interceptor client is further configured to receive a plurality of next identifiers and a plurality of values from said remote device, wherein each next identifier of said plurality of next identifiers has a corresponding value among said plurality of values.

11. A system for improving reliability of data transfer according to claim 10, wherein said interceptor client is further configured to compare one of said first plurality of identifiers with associated one of said plurality of next identifiers.

12. A system for improving reliability of data transfer according to claim 11, wherein said interceptor client is further configured to update said associated value of said one of first plurality of identifiers with corresponding value of said associated one of said plurality of next identifiers in response to said one of said first plurality of identifiers being equivalent to said associated one of plurality of next identifiers.

13. A system for improving reliability of data transfer according to claim 11, wherein said interceptor client is further configured to update said one of said first plurality of identifiers as non-available in response to said one of said first plurality of identifiers being less than said associated one of plurality of next identifiers.

14. A system for improving reliability of data transfer according to claim 11, wherein said interceptor client is further configured to issue another first command in response to said one of said first plurality of identifiers being greater than said associated one of plurality of next identifiers, said another first command specifying said one of said first plurality of identifiers.

15. A computer readable storage medium on which is embedded one or more computer programs, said one or more computer programs implementing a method for improving reliability of data transfer, said one or more computer programs comprising a set of instructions for:
receiving by said interceptor layer a first command from said application layer, said first command specifying a first plurality of identifiers wherein said first command is configured to return an associated value for each identifier of said plurality of identifiers; and
issuing a second command by said interceptor layer, said second command specifying a second plurality of identifiers wherein said second command is configured to return a next identifier and associated value for each identifier of said another plurality of identifiers in response to said receiving of said first command.

16. The computer readable storage medium in according to claim 15, said one or more computer programs further comprising a set of instructions for:
modifying each identifier of said first plurality of identifiers to an associated previous identifier to create said second plurality of identifiers; and
issuing said second command specifying said second plurality of identifiers.

17. The computer readable storage medium in according to claim 16, said one or more computer programs further comprising a set of instructions for:
receiving a plurality of next identifiers and a plurality of values from said remote device, wherein each next identifier of said plurality of next identifiers has a corresponding value among said plurality of values; and
comparing one of said first plurality of identifiers with associated one of said plurality of next identifiers.

18. The computer readable storage medium in according to claim 17, said one or more computer programs further comprising a set of instructions for:
updating said associated value of said one of first plurality of identifiers with corresponding value of said associated one of said plurality of next identifiers in response to said one of said first plurality of identifiers being equivalent to said associated one of plurality of next identifiers.

19. The computer readable storage medium in according to claim 17, said one or more computer programs further comprising a set of instructions for:
    updating said one of said first plurality of identifiers as non-available in response to said one of said first plurality of identifiers being less than said associated one of plurality of next identifiers.

20. The computer readable storage medium in according to claim 17, said one or more computer programs further comprising a set of instructions for:
    issuing another first command in response to said one of said first plurality of identifiers being greater than said associated one of plurality of next identifiers, said another first command specifying said one of said first plurality of identifiers.

\* \* \* \* \*

UNITED STATES PATENT AND TRADEMARK OFFICE
CERTIFICATE OF CORRECTION

PATENT NO. : 6,985,921 B2  Page 1 of 1
APPLICATION NO. : 09/779222
DATED : January 10, 2006
INVENTOR(S) : Covelli et al.

It is certified that error appears in the above-identified patent and that said Letters Patent is hereby corrected as shown below:

Col. 10 (line 43), after "medium", delete "in".

Col. 10 (line 52), after "medium", delete "in".

Col. 10 (line 62), after "medium", delete "in".

Col. 11 (line 4), after "medium", delete "in".

Col. 12 (line 1), after "medium", delete "in".

Signed and Sealed this

Fifteenth Day of August, 2006

JON W. DUDAS
*Director of the United States Patent and Trademark Office*